(12) United States Patent
Nakada

(10) Patent No.: US 12,705,532 B2
(45) Date of Patent: Aug. 11, 2026

(54) DISCRIMINATOR

(71) Applicant: TDK CORPORATION, Tokyo (JP)

(72) Inventor: Kazuki Nakada, Tokyo (JP)

(73) Assignee: TDK CORPORATION, Tokyo (JP)

( * ) Notice: Subject to any disclaimer, the term of this patent is extended or adjusted under 35 U.S.C. 154(b) by 821 days.

(21) Appl. No.: 18/016,833

(22) PCT Filed: Oct. 13, 2020

(86) PCT No.: PCT/JP2020/038610

§ 371 (c)(1),
(2) Date: Jan. 18, 2023

(87) PCT Pub. No.: WO2022/079797

PCT Pub. Date: Apr. 21, 2022

(65) Prior Publication Data

US 2023/0297883 A1 Sep. 21, 2023

(51) Int. Cl.
*G06N 20/00* (2019.01)
*G06F 16/28* (2019.01)
*G06N 3/063* (2023.01)
*G06N 3/08* (2023.01)

(52) U.S. Cl.
CPC ............. *G06N 20/00* (2019.01); *G06F 16/28* (2019.01); *G06N 3/063* (2013.01); *G06N 3/08* (2013.01)

(58) Field of Classification Search
CPC .......... G06N 20/00; G06N 3/063; G06N 3/08; H03H 17/0261; G06F 16/28
USPC ........................................................... 706/12
See application file for complete search history.

(56) References Cited

U.S. PATENT DOCUMENTS

2009/0094304 A1* 4/2009 Batruni .............. H03H 17/0261 708/304
2020/0193232 A1* 6/2020 Wang .................. G06F 18/2148
2024/0095497 A1* 3/2024 Walters .................. G06N 3/045

FOREIGN PATENT DOCUMENTS

CN 114978313 A * 8/2022 ............. G06N 3/045

OTHER PUBLICATIONS

Dec. 22, 2020 International Search Report issued in International Patent Application No. PCT/JP2020/038610.
Umut Ozertem et al. "Detection of Nonlinearly Distorted Signals Using Mutual Information". European Signal Processing Conference, IEEE, 2005.
Simon Haykin. Kalman Filtering and Neural Networks. Wiley-Interscience, 2001.
Takuma Tanaka et al. "Effect of Recurrent Infomax on the Information Processing Capability of Input-Driven Recurrent Neural Networks". Neuroscience Research, 2020, vol. 156, pp. 225-233.

(Continued)

*Primary Examiner* — Shahid A Alam
(74) *Attorney, Agent, or Firm* — Oliff PLC

(57) ABSTRACT

A discriminator includes: a filter bank having a response characteristic to a signal with a specific waveform and including a plurality of matched filters transforming a time-series input signal into a plurality of features in accordance with the response characteristic; a softmax function configured to accept the plurality of features and transform the plurality of features into a probability distribution; and a loss function configured to obtain a cross-entropy loss between the probability distribution and a class label. The parameter of each of the plurality of matched filters is adjusted based on the cross-entropy loss.

3 Claims, 9 Drawing Sheets

(56) References Cited

OTHER PUBLICATIONS

A.N. Chernodub. "Training Neural Networks for Classification Using the Extended Kalman Filter: A Comparative Study". Optical Memory and Neural Networks (Information Optics), 2014, vol. 23, No. 2, pp. 96-103.

* cited by examiner

$u(k)$ $J_i(k) = w_{in,i}u(k)$ $x_{i+1}(k) = K(x_i(k-1), u(k))$ $J_1(k)$ DRU E $Z^{-1}$ 51 $x_1(k-1)$ $J_2(k)$ DRU E $Z^{-1}$ 51

$J_i(k)$ DRU E $Z^{-1}$ 51 $x_i(k-1)$ $J_{i+1}(k)$ DRU E $x_1(k)$ $w_1$ 52

Figure 5:
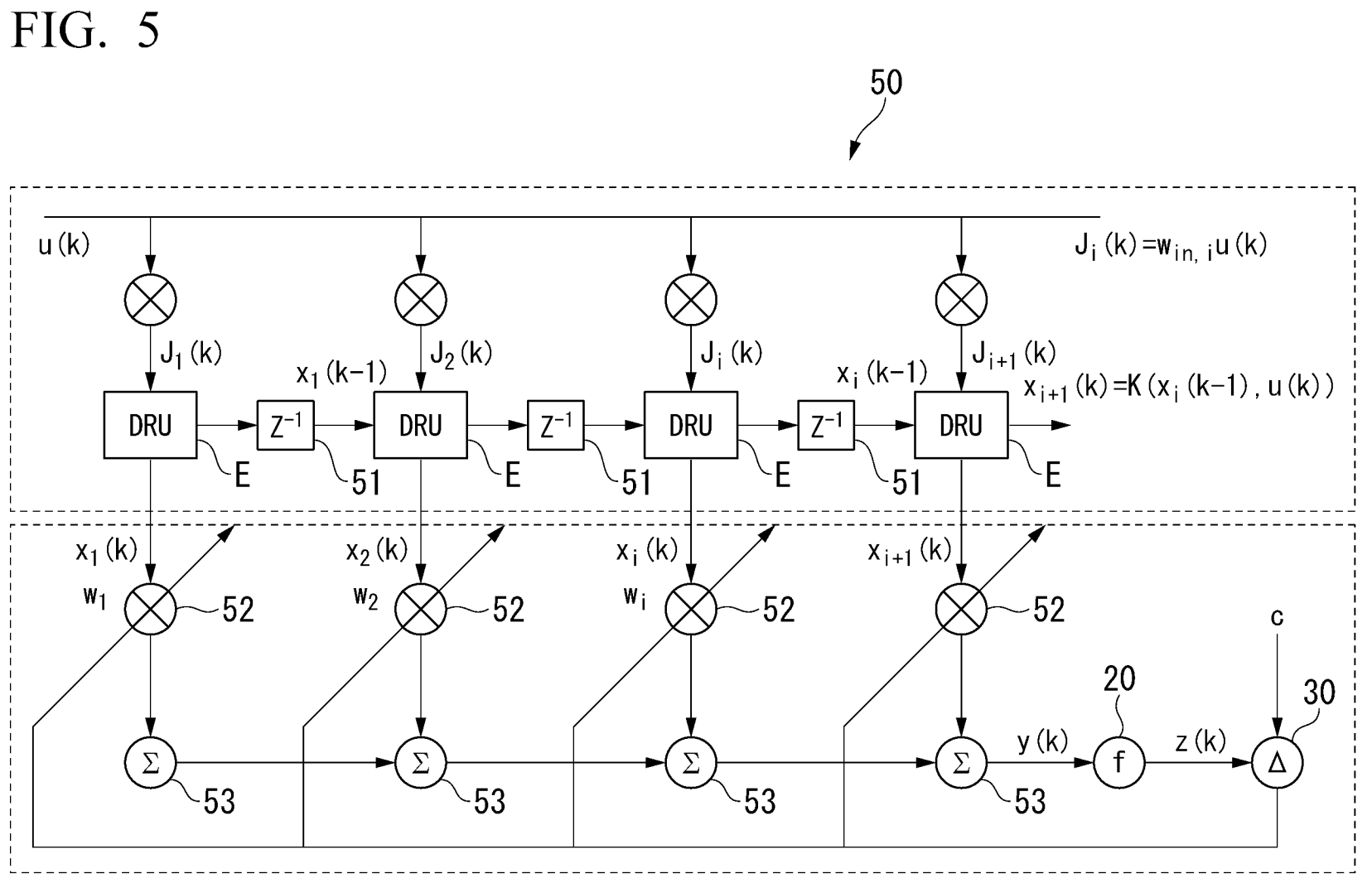

$x_2(k)$ $w_2$ 52

$x_i(k)$ $w_i$ 52

$x_{i+1}(k)$ 52

Σ 53

Σ 53

Σ 53

Σ 53

$y(k)$ f 20

$z(k)$ c

Δ 30

$$r_i(t)=\tanh(b \cdot a_i(t))$$

$$a_i(t)=\varepsilon r_{i-1}(t-1)+(1-\varepsilon)r_i(t-1)+w_{in,i}x_i(t)$$

$$y_j(t)=\sum_{i=1}^{L} w_{ij}(t)r_i(t) \qquad z_k(t)=\sum_{j=1}^{N} w_{out,jk}(t)y_j(t)$$

$$p(t)=\mathrm{softmax}(z(t)) \qquad p(t)=[p_1, p_j, p_M]$$

DISCRIMINATOR

FIELD

The present invention relates to a discriminator.

BACKGROUND

Discriminating a specific signal from a signal containing noise is a basic task in various fields.

As one mechanism for discriminating a specific signal from a signal containing noise, there is a discrimination method using a matched filter. A matched filter is designed to regard a component deviating from an ideal waveform as noise and maximize the ratio between the signal and the noise (an SN ratio). The matched filter is a filter that has a time-inverted waveform of an ideal waveform as an impulse response. The matched filter performs an operation equivalent to an output of a result acquired by multiplying and integrating a signal waveform and the ideal waveform. That is, the matched filter functions as a correlation detector.

Further, as an expansion of the matched filter, there is a nonlinear matched filter. A nonlinear matched filter optimizes a characteristic of a filter in conformity with various norms instead of maximizing an SN ratio. For example, Non-Patent Document 1 discloses that an input signal can be properly classified by adjusting a parameter adaptively so that a mutual information amount of the probability distribution and a class label are maximized by approximating a probability distribution from an input signal using a kernel density function.

CITATION LIST

Non-Patent Document

Non-Patent Document 1

U. Ozertem, D. Erdogmus, and I. Santamaria, Detection of nonlinearly distorted signals using mutual information, European Signal Processing Conference. IEEE, 2005.

Non-Patent Document 2

Kalman Filtering and Neural Networks, S. Hykin, Wiley-Interscience, 2004.

Non-Patent Document 3

T. Tanaka, K. Nakajima, and T. Aoyagi, Effect of recurrent infomax on the information processing capability of input-driven recurrent neural networks. Neuroscience Research, 2020.

SUMMARY OF INVENTION

Technical Problem

However, when a probability distribution is approximated using a kernel density function, a calculation amount for adaptively updating a parameter of a filter increases, and thus it is difficult to implement efficient calculation within a realistic time. In a discriminator referring to only a class label, to improve discrimination accuracy of an input signal, an extension to many classes can be considered. However, even approximation of only one probability distribution results in a massive calculation amount and extension to many classes is difficult.

The present invention has been devised in view of the foregoing circumstances and provides a discriminator capable of discriminating an input signal within a realistic time with high accuracy.

Solution to Problem (1) A first aspect of a discriminator includes: a filter bank including a plurality of nonlinear matched filters each having a response characteristic to a signal with a specific waveform and each transforming a time-series input signal into a plurality of features in accordance with the response characteristic; a softmax function configured to receive the plurality of features and transform the plurality of features into a probability distribution; a loss function configured to obtain a cross-entropy loss (error) between the probability distribution and class labels; and a parameter updating unit configured to adjust a parameter of each of the plurality of nonlinear matched filters based on the cross-entropy loss.

(2) In the discriminator according to the foregoing aspect, the filter bank may be reservoir computing that has a reservoir for nonlinear transform of a signal and an output layer applying weights to signals transformed by the reservoir and outputting a signal. The parameter may be the weight of the output layer.

(3) In the discriminator according to the foregoing aspect, a parameter of the reservoir may be set by pre-training based on a mutual information amount reference.

(4) In the discriminator according to the foregoing aspect, the parameter updating unit may include an extended Kalman filter. The parameter may be determined based on a value acquired by multiplying the cross-entropy loss by a Kalman gain.

(5) In the discriminator according to the foregoing aspect, the filter bank may include a plurality of elements to which the input signal is input, a plurality of registers connecting an n-th (where n is a natural number) element to an n+1-th element and inputting a signal from the n-th element to the n+1-th element with a delay, a plurality of multipliers multiplying each of output signals output from the plurality of elements by a weight, and an adder adding results multiplied by the plurality of multipliers. A result added by the adder may be input to the softmax function.

Advantageous Effects

The discriminator according to the foregoing aspect is capable of discriminating an input signal within a realistic time with high accuracy.

BRIEF DESCRIPTION OF DRAWINGS

FIG. 5 is a diagram illustrating an example of a specific configuration of the discriminator according to the first embodiment.

DESCRIPTION OF EMBODIMENTS

Figure 1:
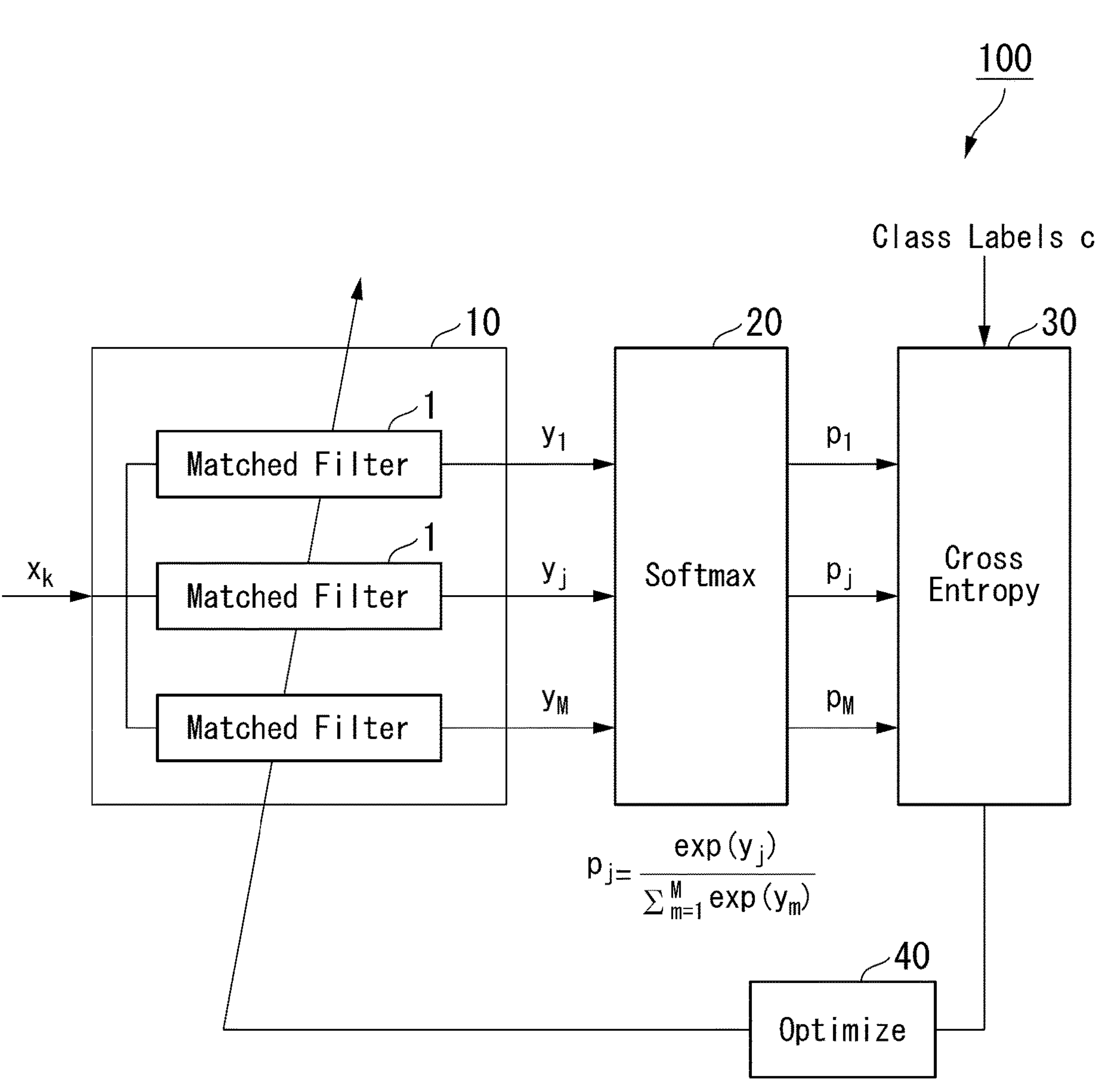
FIG. 1 is a conceptual diagram illustrating a discriminator according to a first embodiment.

Hereinafter, embodiments will be described in detail appropriately with reference to the drawings. In the drawings used for the following description, characteristic portions are enlarged to facilitate understanding of features of the present invention in some cases, and thus dimensional ratios of constituent elements may be different from actual dimensional ratios. Materials, dimensions, and the like provided in the following description are exemplary examples, and the present invention is not limited thereto and can be appropriately modified in a scope in which the advantageous effects of the present invention are obtained.

First Embodiment

FIG. 1 is a conceptual diagram illustrating a discriminator according to a first embodiment. A discriminator 100 includes a filter bank 10, a softmax function 20, a loss function 30, and a parameter updating unit 40.

The filter bank 10 includes a plurality of nonlinear matched filters 1. The nonlinear matched filter 1 is a filter that notably responds only when an input signal has a specific waveform component.

Each of the nonlinear matched filters 1 has a response characteristic to a signal with a specific waveform. The specific waveform can be set as any waveform based on an input time-series signal. The specific waveform set in each of the nonlinear matched filters 1 differs, for example. The specific waveform is set as a reference label in the discriminator 100 and is changed in accordance with, for example, a parameter obtained in the parameter updating unit 40 to be described below.

The response characteristic of the nonlinear matched filter 1 changes in accordance with the set reference label. Each of the nonlinear matched filters 1 notably responds, for example, when an input signal includes a component of the reference label.

Each of the nonlinear matched filters 1 obtains a conditional probability between the input signal and the reference signal. The conditional probability is a probability which is a signal in which an input signal corresponds to the reference label.

The nonlinear matched filter 1 ascertain a time structure of a time-series input signal based on the conditional probability between the input signal and the reference label. A process in the nonlinear matched filter 1 performs calculation in a frequency domain in terms of mounting. Hereinafter, a specific example will be given.

First, a time-series input signal $x_k$ is input to the nonlinear matched filter 1. The time-series signal is, for example, a biological signal, a wireless communication signal, or the like. The biological signal includes a component that varies periodically and a noise component that varies due to fluctuation or noise. The wireless communication signal contains noise while a component expressed originally in binary values propagates, and includes an appropriate signal component and a noise component.

In each of the nonlinear matched filters 1, for example, a different reference label is set. Since it is not known which input is a correct signal or noise in the input signal $x_k$, conditional probabilities between the input signal $x_k$ and various reference labels are calculated. For example, when the input signal $x_k$ is a signal in which noise is added to a signal such as "100" and passes through the nonlinear matched filter 1 in which "100" is set as a reference label, a conditional probability is output as a value close to "100%." When the input signal $x_k$ passes through the nonlinear matched filter 1 in which, for example, "010" other than "100" is set as a reference label, a conditional probability is output as a value close to "0%." Here, for simplicity, the examples in which values close to "100%" and "0%" are output have been given, but the probability therebetween can be output, of course.

Each of the nonlinear matched filters 1 outputs a conditional probability between the input signal $x_k$ and each of the reference labels set for each of the nonlinear matched filters 1. The nonlinear matched filter 1 passes and detects only a signal corresponding to the reference label. The ratio of a signal amount passing through the nonlinear matched filter 1 in the input signal $x_k$ becomes a conditional probability.

For example, the nonlinear matched filter 1 outputs a High signal when the proportion of components of signals corresponding to the reference labels included in the time-series input signal $x_k$ is high. The nonlinear matched filter 1 outputs a Low signal when the proportion of components of signals corresponding to the reference labels included in the time-series input signal $x_k$ is small. "High" is, for example, a value equal to or greater than 0.5 and equal to or less than 1.0 and "Low" is, for example, a value equal to or greater than 0 and less than 0.5. The "High" and "Low" values vary in accordance with component ratios between specific waveforms included in the input signal $x_k$. When the nonlinear matched filter 1 transforms the input signal $x_k$ into a binary value, "High" is "1" and "Low" is "0." When the input signal $x_k$ includes a component of a signal corresponding to the reference label, a signal of "1" is output. When the input signal $x_k$ does not include a component of a signal corresponding to the reference label, a signal of "0" is output. The value of "High,' "Low," "1," and "0" are examples of features $y_1$ to $y_M$.

The response characteristic of each of the plurality of nonlinear matched filters 1 is different. For example, after the input signal $x_k$ passes through a certain nonlinear matched filter 1, the input signal $x_k$ is transformed into the specific amount $y_1$ such as "Low." After the input signal $x_k$ passes through another nonlinear matched filter 1, the input signal $x_k$ is transformed into a specific amount $y_j$ such as "High.". For example, when each of the nonlinear matched filters 1 transforms the input signal $x_k$ into a binary value, the input signal $x_k$ is transformed into a feature such as $(y_1, y_j, y_M)=(1, 0, 0)$.

The features $y_1$ to $y_M$ may be frequencies. For example, each of the nonlinear matched filters 1 is assumed to pass only a signal with a specific frequency. In this case, the features $y_1$ to $y_M$ are, for example, $y_1$=1 MHz, $y_j$=10 MHz, and $y_M$=100 MHz.

The softmax function 20 is an activation function that receives the plurality of features $y_1$ to $y_M$ and transforms the plurality of features $y_1$ to $y_M$ into a plurality of output values $p_1$ to $p_M$ of which the sum is 1.0. The sum of the plurality of output values $p_1$ to $p_M$ is 1.0. When the sum of the plurality of output values $p_1$ to $p_M$ is considered to be 100%, the output values $p_1$ to $p_M$ is probability distributions of the plurality of features $y_1$ to $y_M$. That is, the softmax function 20 transforms the plurality of features $y_1$ to $y_M$ into each occurrence probability.

For example, when the softmax function 20 outputs output values such as ($p_1$, $p_j$, $p_M$)=(0.60, 0.35, 0.05), an occurrence probability of the specific amount $y_1$ is 60%, an occurrence probability of the specific amount $y_j$ is 35%, and an occurrence probability of the specific amount $y_M$ is 5%.

The loss function 30 obtains an error between an occurrence probability and a discrimination signal. The error is, for example, a cross-entropy loss. The discrimination signal is a class label c in a classification problem. The loss function 30 accepts the plurality of class labels c as inputs and obtains a cross-entropy loss between a probability distribution and the class labels c.

The discriminator 100 performs inference (discriminating) based on a training result using input signals and training based on a discrimination result. A process of discriminating an input signal to the class label c in which the cross-entropy loss is the minimum is an inference process.

The discriminator 100 performs a training process. The training process is performed mainly by the parameter updating unit 40. The parameter updating unit 40 determines a parameter of the nonlinear matched filter 1 based on the error obtained by the loss function 30. The response characteristic of the nonlinear matched filter 1 is changed in accordance with the parameter. When the parameter of the nonlinear matched filter 1 is changed, the reference label is changed and the conditional probability between the input signal and the reference label is changed. As a result, the features $y_1$ to $y_M$ are changed. When the features $y_1$ to $y_M$ are changed, the probability distribution of the features $y_1$ to $y_M$ is changed an error from the class label c is also changed. The parameter is determined so that the error between the probability distribution and the class label c decreases.

Adjustment of the parameter in the parameter updating unit 40 is performed by training using an extended Kalman filter. Calculation efficiency is improved by adjusting the parameter using the extended Kalman filter by training. The details of the extended Kalman filter will be described in a second embodiment.

The discriminator 100 according to the first embodiment can adjust the parameter of the nonlinear matched filter 1 by using information regarding many classes based on the cross-entropy loss. Therefore, discrimination accuracy of the input signal $x_k$ can be improved.

The discriminator 100 according to the first embodiment can also transform the time-series input signal $x_k$ into the features $y_1$ to $y_M$ online by using the nonlinear matched filter 1.

Here, for example, filtering is performed even in a process (an image discrimination process) of extracting a characteristic portion from an image in some cases. Even in image discrimination, a parameter of a filter is adjusted to improve image discrimination accuracy by training. For example, in deep learning, a kernel of a convolution filter used for image discrimination is known to have a characteristic close to a Gabor filter.

A filter used for image discrimination extracts a potential spatial structure of an image, that is, continuity or discontinuity between adjacent pixels as a feature from data (information regarding actual pixels). Therefore, in the case of time-series data updated moment by moment, it is difficult to acquire all information online and it is difficult to use the filter used for the image discrimination. The filter used for the image discrimination is, for example, the minimum average correlation energy (MACE) filter. The MACE filter calculates mutual correlation between images in a frequency domain by discrete Fourier transform. The MACE filter needs to perform discrete Fourier transform and cannot be applied when a time-series signal is processed online.

Thus, the nonlinear matched filter 1 can ascertain a time structure of a time-series signal accurately as characteristics. For example, the nonlinear matched filter 1 can ascertain a time-series time structure by obtaining a conditional probability between an input signal and a reference label (a label corresponding to a signal with an ideal waveform).

The discriminator 100 according to the embodiment does not compare the features $y_1$ to $y_M$ transformed by the nonlinear matched filter 1 with the class labels c, but transforms the features $y_1$ to $y_M$ into the probability distribution and then calculates a mutual information amount of the probability distribution and the class labels c. The discriminator 100 according to the embodiment associates a process of maximizing the mutual information amount with a process of minimizing the cross-entropy loss. Discrimination accuracy of the discriminator 100 is improved by maximizing the mutual information amounts.

The discriminator 100 according to the embodiment estimates the probability distribution using the nonlinear matched filters 1 and the softmax function 20 and adjusts the parameter of the nonlinear matched filter 1. Compared to a case in which the probability distribution is estimated from a kernel density function, the calculation amount at the time of adjustment of the parameter does not become huge.

Second Embodiment

Figure 2:
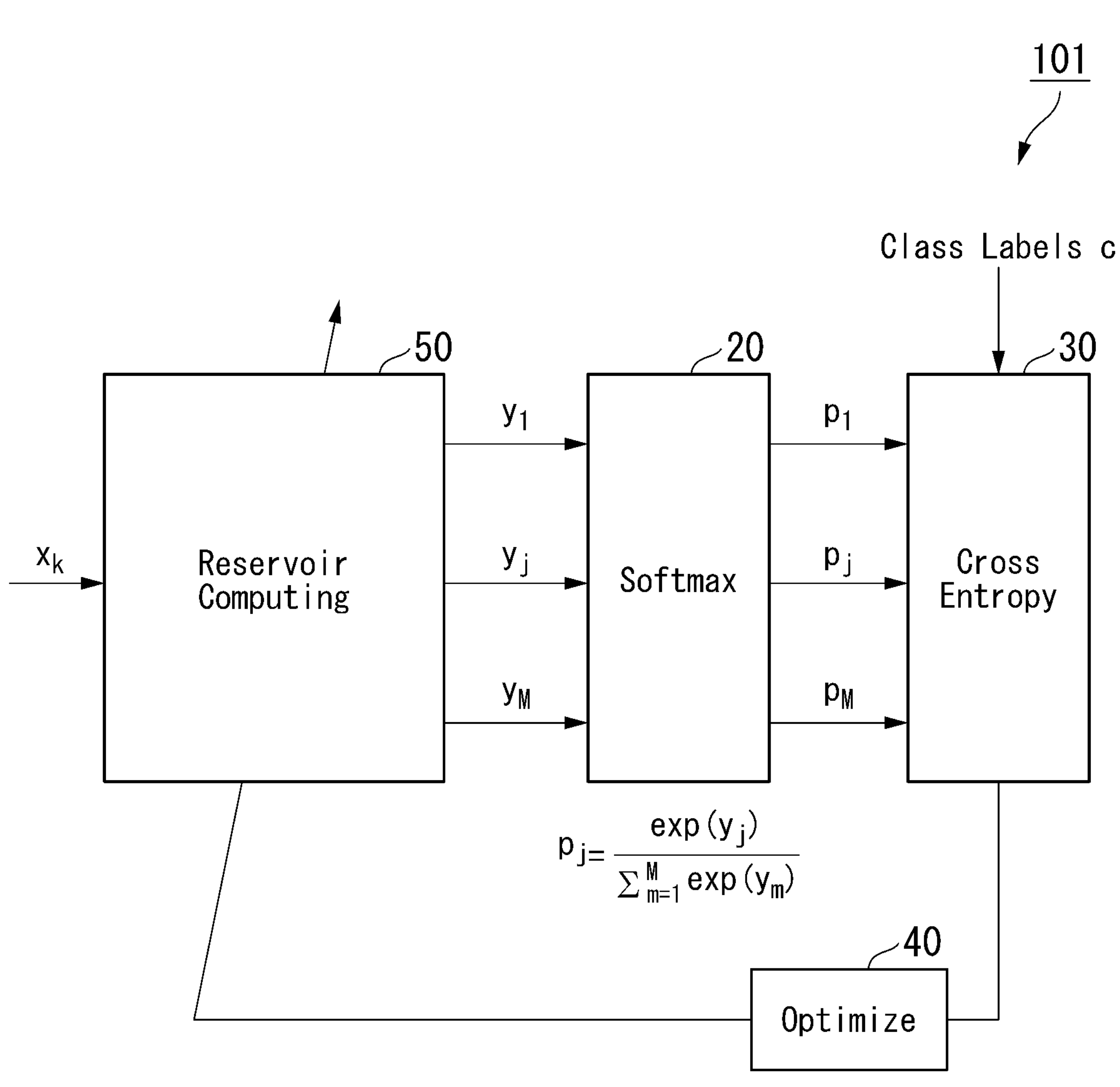
FIG. 2 is a conceptual diagram illustrating a discriminator according to a second embodiment.

FIG. 2 is a conceptual diagram illustrating a discriminator 101 according to a second embodiment. The discriminator 101 includes reservoir computing 50, a softmax function 20, a loss function 30, and a parameter updating unit 40. The discriminator 101 is different from the discriminator 100 in that the filter bank 10 is replaced with the reservoir computing 50. In the discriminator 101, the same reference numerals are given in the same configuration as that of the discriminator 100 and a description thereof will be omitted.

The reservoir computing 50 is one mechanism that implements a recurrent neural network. The recurrent neural network is a calculation mechanism that handles nonlinear time-series data and processes the time-series data by returning a processing result in a neuron of a rear-stage layer to a neuron of a front-stage layer. The reservoir computing 50 performs recursive processing by interacting signals. The reservoir computing 50 imitates, for example, an operation of a cerebellum and performs recursive data processing or data transform (for example, coordinate transform).

Figure 3:
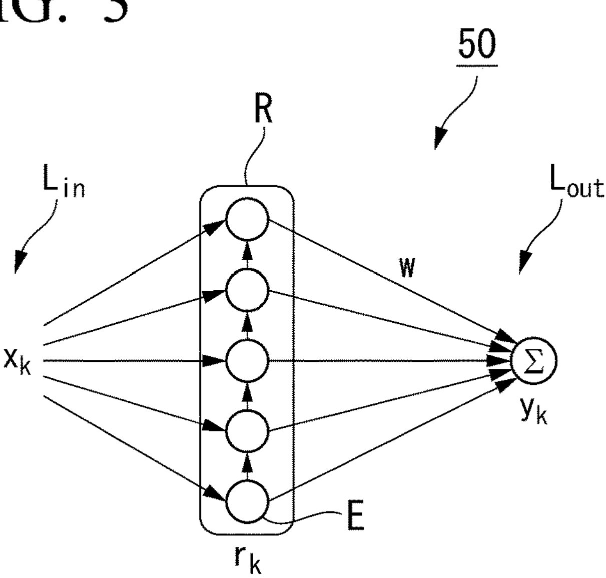
FIG. 3 is a conceptual diagram illustrating an example of reservoir computing.

FIG. 3 is a conceptual diagram illustrating an example of the reservoir computing 50. The reservoir computing 50 illustrated in FIG. 3 includes an input layer $L_{in}$, a reservoir layer R, and an output layer $L_{out}$.

The input layer $L_{in}$ transfers the input signal $x_k$ input from the outside to the reservoir layer R. The input signal $x_k$ is, for example, a time-series signal.

The reservoir layer R includes a plurality of elements E. Each of the plurality of elements E is connected to other elements E. Each of the plurality of elements E may be connected randomly or may be connected, for example, one-dimensionally, as illustrated in FIG. 3.

The input signal $x_k$ is transferred between other elements E, and thus the input signals $x_k$ input to the elements E are interacted to become nonlinear separate signals $r_k$. The signal $r_k$ is a signal which is based on the input signal $x_k$. The signal $r_k$ can be acquired by interacting a signal input to a certain element E and a signal propagating from another element E to the certain element E. A signal propagating from another element E to the certain element E is delayed more than a signal input to the certain element E by a propagation time of the signal. That is, the signal $r_k$ includes information regarding a time k and a time k+1.

The output layer $L_{out}$ applies a weight w to the signal $r_k$ output from the reservoir layer R and outputs a signal to the softmax function 20. A signal $y_k$ output from the output layer $L_{out}$ is replaced with another signal while having information regarding the input signal $x_k$ which has been input. For example, a P-dimensional input signal $x_k$ is transformed into a Q-dimensional signal $y_k$ (where P and Q are natural numbers) in the reservoir layer R. The weight w is determined based on an error obtained by the loss function 30 to be described below and is rewritten by training. The weight w corresponds to a parameter of the matched filter 1 in the discriminator 100.

As illustrated in FIG. 3, the reservoir computing 50 divides the signal $x_k$ which has been input into a plurality of features $y_1$ to $y_M$ (where M is a natural number). Each of the plurality of features $y_1$ to $y_M$ includes information regarding the input signal $x_k$ input to the reservoir computing 50. Each of the features $y_1$ to $y_M$ is, for example, output from a different element E of the reservoir layer R.

Until the input signal $x_k$ becomes the plurality of features $y_1$ to $y_M$, paths along which the signals propagate are different from each other. The paths along which the input signal $x_k$ reaches the plurality of features $y_1$ to $y_M$ can be regarded as the different nonlinear matched filters 1. That is, the plurality of features $y_1$ to $y_M$ can each be regarded as being acquired by transforming the input signal $x_k$ through the different nonlinear matched filters 1. For example, the specific amount $y_1$ is acquired by transforming the input signal $x_k$ through a first nonlinear matched filter, the specific amount $y_j$ is acquired by transforming the input signal $x_k$ through a second nonlinear matched filter different from the first nonlinear matched filter, and the specific amount $y_M$ is acquired by transforming the input signal $x_k$ through a third nonlinear matched filter different from the first and second nonlinear matched filters.

The parameter updating unit 40 determines the weight w of the output layer $L_{out}$ of the reservoir computing 50 based on the error obtained by the loss function 30. When the weight w is changed, the weight w is determined so that an error between the probability distribution and the discrimination signal is small.

The parameter updating unit 40 includes, for example, an extended Kalman filter. The parameter updating unit 40 updates the weight in sequence based on a value acquired by multiplying the error by a Kalman gain. When the weight w is updated using the extended Kalman filter, the following relational expression is established.

$$\hat{w}_{k+1}=\hat{w}_k+K_k e_k, e_k=y_k-\hat{y}_k \quad \text{[Math. 1]}$$

$w_k\hat{}$ is a weight before the updating and $w_{k+1}\hat{}$ is a weight after the updating. $K_k$ is a Kalamn gain and $e_k$ is a cross-entropy loss. Here, a target signal $y_k\hat{}$ corresponds to a class label and is a vector in which a one-hot is expressed.

When a stochastic gradient method (a steepest descent method) is used to optimize the weight w, the calculation falls into a local solution or diverges in some cases. For example, when a gradient which differs from that of Kalman gain is used and a least square error is used as a norm is used, the calculation falls into a local solution or diverges in some cases. Conversely, when an error is multiplied by a Kalman gain using an extended Kalman filter as the parameter updating unit 40, the calculation can be stably solved.

This is because a parameter space to be used is not a Euclidean space but a Riemannian space when a parameter of a weight is updated from data. When a parameter of a weight is updated from data in machine learning, an error (loss) function is defined and the error function in a parameter space of the weight is minimized. In sequential training in which a weight is updated in every acquisition of data, a gradient of an error function is calculated and an advance to a minimum value of the error function along the gradient (like a descent) is made. At this time, in the case of a Euclidean space where a parameter space of a weight is a normal orthogonal space, the gradient itself becomes a steepest descending direction (a true steep direction). Conversely, in the case of a Riemannian space where there is no such a tendency, it is desirable to use a natural gradient (a gradient multiplied by an inverse matrix of a Fisher information matrix). It is implied that an online natural gradient method is equivalent to parameter estimation by a Kalman filter. The online natural gradient method has an effect of improving convergence and stability in training by multiplying a Kaman gain (a vector or a matrix) to correct a direction.

A Kalman gain in the extended Kalman filter satisfies the following relational expression.

$$K_k = P_k H_k A_k \quad \text{[Math. 2]}$$
$$A_k = \left[R + H_k^T P_k H_k\right]^{-1}$$
$$P_{k+1} = P_k - K_k H_k^T P_k + Q$$

$K_k$ is a Kalman gain, $R_1$ is a covariance matrix of observation noise, Q is a covariance matrix of system noise, $P_k$ is an error covariance matrix, $H_k$ is a Jacobian and is expressed as in the following expression.

$$H_k = \left.\frac{\partial h(x, u)}{\partial x}\right|_{x=x_k} \quad \text{[Math. 3]}$$

$x_k$ is a state value (equivalent to a parameter to be estimated) and $h(\cdot)$ is an observation equation of the state value.

Here, a training algorithm in which an extended Kalman filter is applied to a neural network has been proposed so far without being limited to the reservoir computing. On the other hand, it should be noted that the training algorithm cannot be applied as it is to the configuration of the discriminator 100. For example, when a state value ($x_k$) to be estimated by an extended Kalman filter is regarded as a training parameter of a neural network, an observation equation (h(x, u)) can be regarded as a neural network itself. At this time, an input u to the observation equation corresponds to a neural network state value. Accordingly, in accordance with a configuration of a training target neural network, it is necessary to derive a Jacobian appropriate for the configuration of the training target neural network.

In this way, in training of a neural network by a Kalman filter, it is necessary to obtain a Kalman gain for each layer of the neural network. For example, in Non-Patent Document 2, a shallow feedforward network is regarded as a discriminator and a Kalman gain is derived using a cross-entropy loss as a norm.

In the discriminator 101 according to the embodiment, on the other hand, in addition to an output layer of the reservoir computing 50, a layer including the softmax function 20 is vertically connected to form an output layer formed by a plurality of layers. Thus, a Kalman gain appropriate for the configuration is newly derived.

The discriminator 101 according to the second embodiment has the advantageous effects similar to those of the discriminator 100 according to the first embodiment. The discriminator 101 according to the second embodiment includes the reservoir computing 50 and the weight w is frequently changed by the parameter updating unit 40. That is, the discriminator 101 can update the weight w by machine learning.

The discriminator 100 according to the first embodiment transforms the input signal $x_k$ into the plurality of features $y_1$ to $y_M$ using the reservoir layer R. An output from each element E in the reservoir layer R includes information regarding a process at another time. For example, a signal output from an element E at a certain time k includes information regarding propagation of a signal from another element E to the certain element E at a time k−1 one time before. That is, the reservoir layer R is appropriate for a process on a time-series signal.

In the discriminator 101 according to the first embodiment, the reservoir layer R may be pre-learned. In the pre-training, the weight w set between the elements E in the reservoir layer R is determined. In the pre-training, it is determined at which past time the signal $r_k$ output from each element E keeps a memory for propagation of a signal. For example, when a memory for propagation of a signal 1 time ago is kept, the signal $r_k$ has only information regarding an element E one before reaching the element E. When a memory for propagation of a signal 2 times ago is kept, the signal $r_k$ has up to information regarding the second last element E reaching the element E. The value of the signal $r_k$ output from each element E changes.

Figure 4:
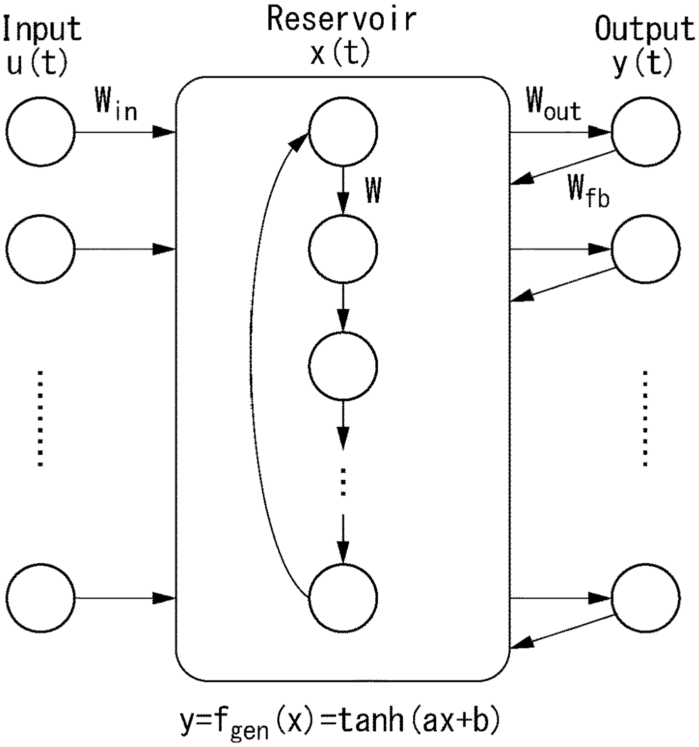
FIG. 4 is a conceptual diagram illustrating reservoir computing in which pre-training is performed.

FIG. 4 is a conceptual diagram illustrating reservoir computing 50 in which pre-training is performed. The pre-training is performed by, for example, recurrent infomax (RI) training.

The pre-training is performed so that an information transmission amount in a reservoir in continuous time steps is maximized. For example, the pre-training is performed so that mutual information amounts of a state value at a certain time and a state value at a subsequent time in the reservoir layer R increase. The pre-training is repeated to reduce a signal loss between a waveform 1 time earlier and a waveform 1 time later, for example, in the reservoir layer R. In the pre-training, a parameter to be learned is any parameter of the reservoir layer R. The initial value before training can be arbitrarily set. For example, a random number is generated and set from a uniform distribution of [−1:1] or a normal distribution. The mutual information amount is an amount indicating a measure of interdependence of two random variables. An information transmission amount in the reservoir layer R increases by repeatedly maximizing the mutual information amount of a state value at a certain k and a state value at a subsequent time k+1 in the reservoir layer R.

As the mutual information amount, for example, a Kullback-Leibler information amount can be used. Training for increasing the mutual information amount is performed, for example, using recurrent infomax (RI) learning as in Non-Patent Document 3. The recurrent infomax learning is one mechanism for maximizing an information transmission amount of a recurrent neural network in machine learning.

FIG. 5 is a diagram illustrating an example of a specific configuration of the discriminator according to the first embodiment. The reservoir computing 50 includes a plurality of elements E, a plurality of registers 51, a plurality of multipliers 52, and an adder 53.

The register 51 connects an n-th (where n is a natural number) element E to an n+1-th element E. The register 51 input a signal from the n-th element E to the n+1-th element with a delay. The input signal $x_k$ propagating in each element E interacts nonlinearly via the register 51.

The multiplier 52 multiplies the signal $r_k$ output from each element E by the weight w. The adder 53 adds results multiplied by the multipliers 52. A result added by the adder 53 is input to the softmax function 20.

The reservoir computing 50 can be configured as a digital filter (FIR filter).

EXAMPLES

Example 1

Figure 6:
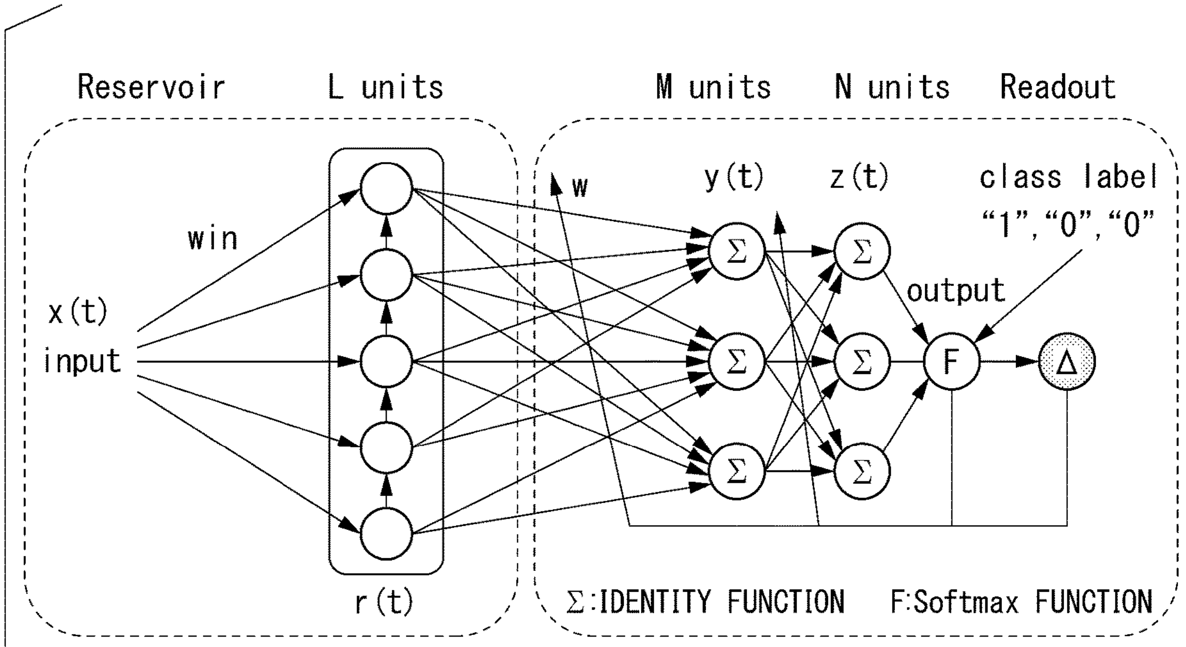
FIG. 6 is a conceptual diagram illustrating a discriminator used for calculation according to an example.

FIG. 6 is a conceptual diagram illustrating a discriminator used for calculation according to an example. In Example 1, biological pulse waves were used as an input signal x(t). In FIG. 6, r(t) is a first function of the reservoir layer R. a and b are parameters that determine the first function, a is expressed by a function illustrated in FIG. 6 and ε=0.5 was set, and b was set to b=1.25. The number of elements E of the reservoir layer R was set to 100 units.

$y_j(t)$ corresponds to a weight product operation in the output layer $L_{out}$. z(t) corresponds to a sum operation in the output layer $L_{out}$. The sum calculation result at z(t) is input to a softmax function F and is output as p(t). A Kalman gain in an extended Kalman filter was strictly derived based on the foregoing Expressions 1 and 2. That is, the derivation of a Jacobian in Expression 2 was obtained by partially differentiating the softmax function. $w_{ij}$ and $w_{out}$,jk are weights. The number of elements of the output layer $L_{out}$ and the softmax function was all set to 10 units.

Figure 7:
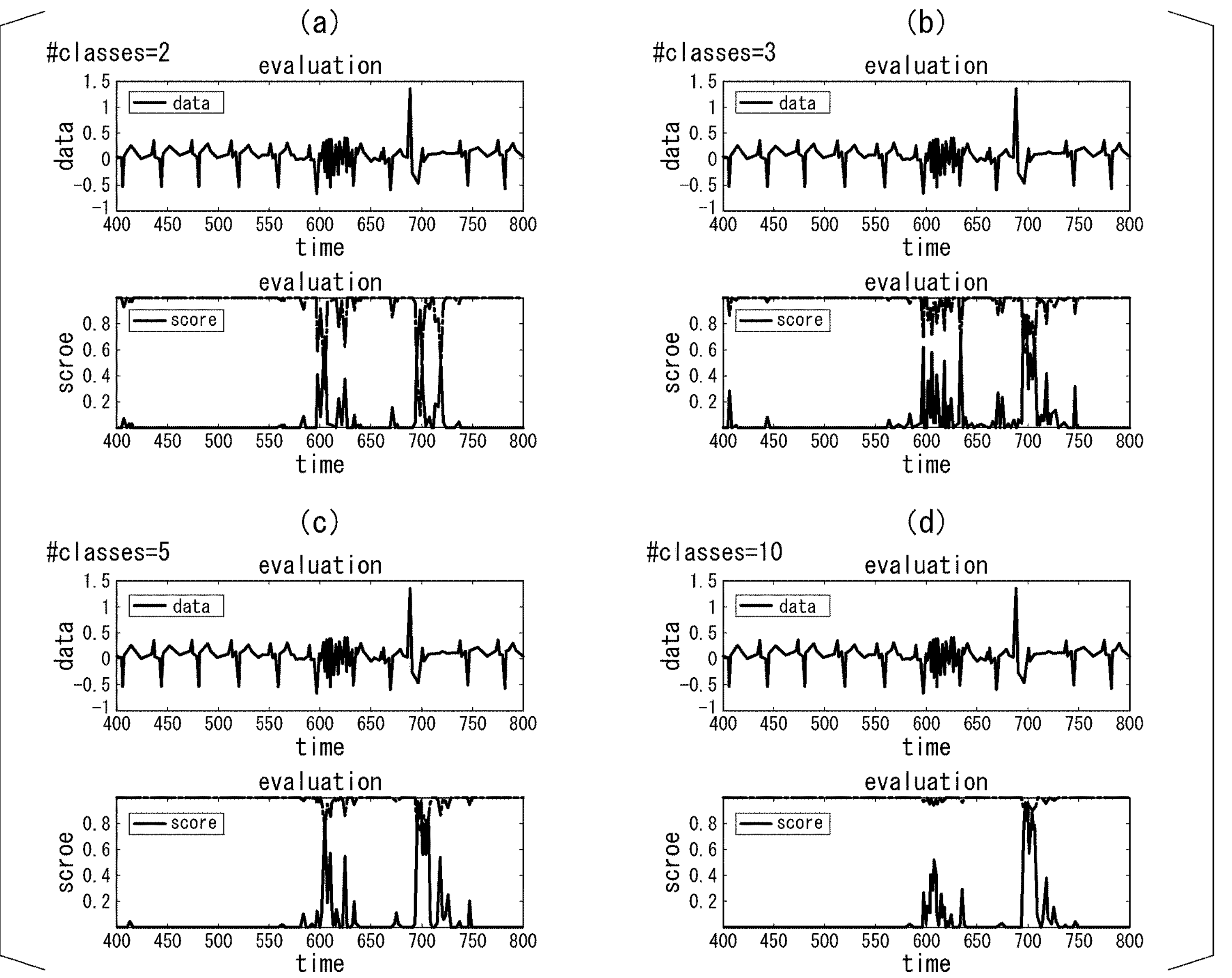
FIG. 7 is a diagram illustrating results of Example 1.

Discrimination of a signal and noise from an input signal was performed using a discriminator with reference to FIG. 6. FIG. 7 is a diagram illustrating results of Example 1. In Example 1, the calculation was performed by changing the number of class labels c. In FIG. 7, the class labels c was set to 2 in (a), the class labels c was set to 3 in (b), the class labels c was set to 5 in (c), and the class labels was set to 10 in (d).

In each drawing of FIG. 7, the upper drawing illustrates a waveform of the input signal x(t), and the lower figure illustrates a score (a dotted line) of a negative example label and a score (a solid line) of a positive example label. As the score of the positive example label is higher, the discriminator discriminates the signal containing noise.

As illustrated in FIG. 7, the scores of the positive example label and the negative example label fluctuate in a portion where the input signal x(t) is disturbed. That is, in either case, it can be said that the discriminator appropriately discriminates noise. Further, as the number of class labels c is larger, the score of the positive example label at a position at which the signal is disturbed is larger and a fluctuation amount of the score of the negative example label is smaller. That is, it can be said that as the number of class labels is larger in the discriminator, an SN ratio is higher.

Example 2

Example 2 is different from Example 1 in that a waveform of an input signal is changed. Example 2 was performed with reference to the conceptual diagram of the discriminator illustrated in FIG. 6, as in Example 1. In Example 2, a radio signal containing noise was used as the input signal x(t). In Example 2, ε=0.2 was set. In Example 2, description of the same conditions as in Example 1 will be omitted.

Figure 8:
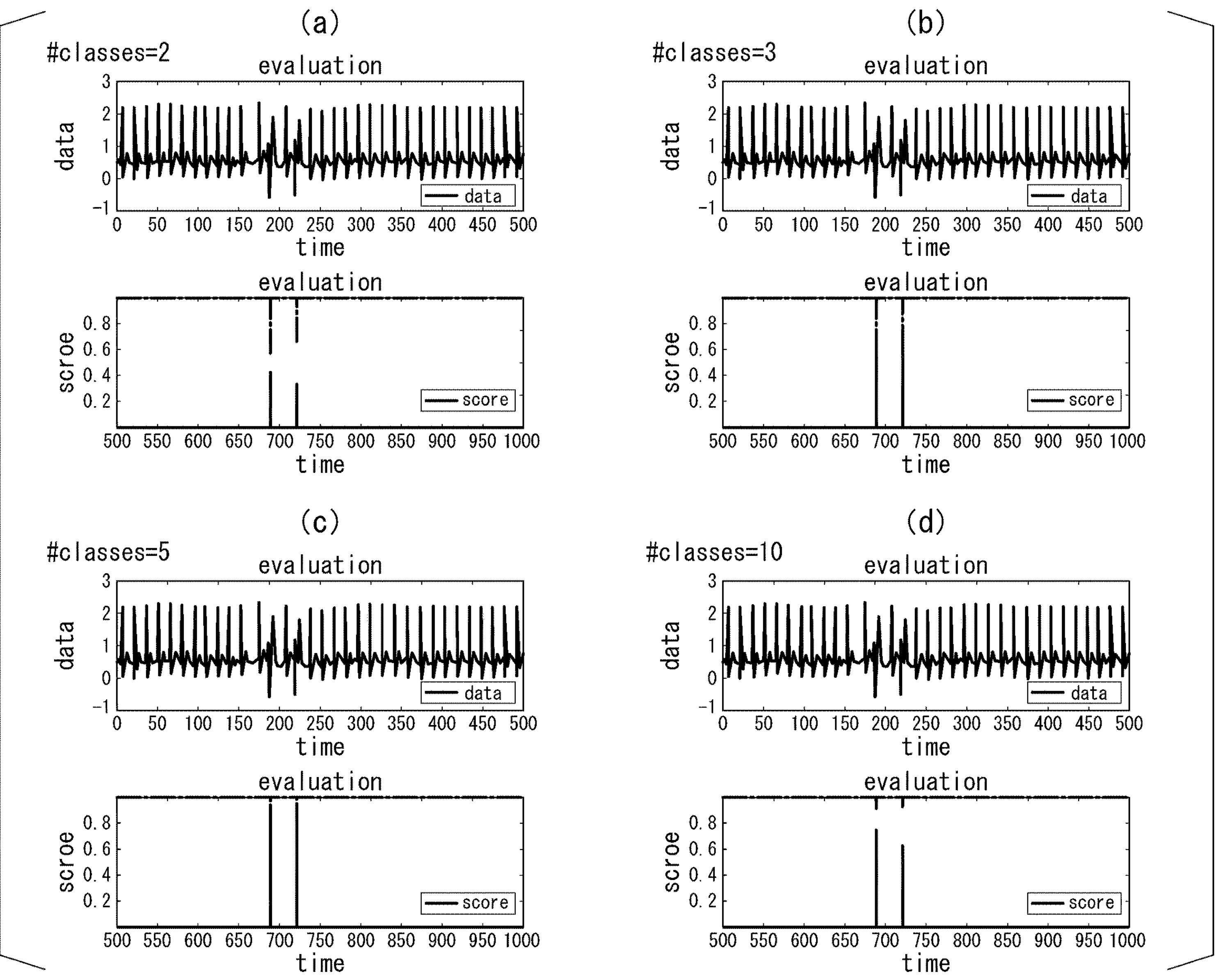
FIG. 8 is a diagram illustrating results of Example 2.

FIG. 8 is a diagram illustrating results of Example 2. FIG. 8 shows the results of Example 2. In Example 2, calculation was performed by changing the number of class labels c. In FIG. 8, the class labels c was set to 2 in (a), the class labels c was set to 3 in (b), the class labels c was set to 5 in (c), and the class labels c was set to 10 in (d).

In (a) to (d), the discriminator was able to discriminate noise from the signal. As the number of class labels c was larger, accuracy of the discriminator was further improved.

Example 3

Example 3 is different from Example 1 in that the derivation of a Jacobian in Expression. 3 is approximately replaced. When partial differentiation of Jacobian derivation was performed, the amount of computation increased. Therefore, this point was approximated and simplified.

Specifically, instead of the cross-entropy loss, a difference between the class labels and an output of the softmax function was used as an error, and the Jacobian was calculated based on this error. By using an activation function of a lead-out layer as an identity function, the Jacobian calculation is approximately replaced and simplified. From the Jacobian obtained as described above, a weight of the lead-out layer was updated by extended Kalman filter training.

The softmax function is a vector function, and the Jacobian becomes a matrix in an explicit solution method. However, the Jacobian becomes a vector in an approximate solution method. Therefore, calculation efficiency is improved.

Figure 9:
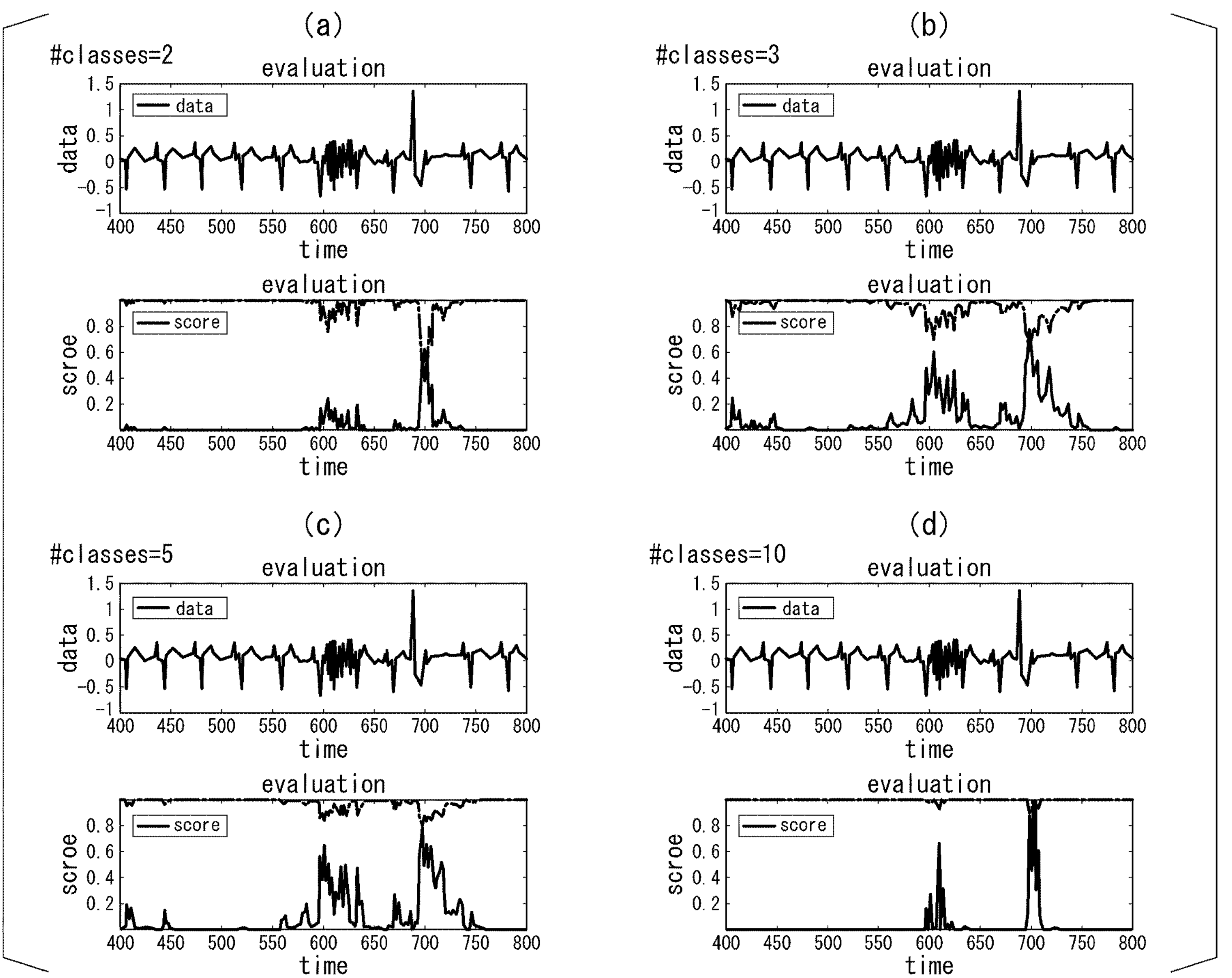
FIG. 9 is a diagram illustrating results of Example 3.

FIG. 9 is a diagram illustrating results of Example 3. In Example 3, calculation was performed by changing the number of class labels c. In FIG. 9, the class labels c was set to 2 in (a), the class labels c was set to 3 in (b), the class labels c was set to 5 in (c), and the class labels c was set to 10 in (d).

As illustrated in FIG. 9, in Example 3, the discriminator was able to discriminate that the signal contained noise as in Example 1.

Example 4

Example 4 is different from Example 2 in that, as in Example 3, the derivation of a Jacobian in Expression 3 is approximately replaced. Calculation efficiency in Example 4 was improved more than in Example 2.

Figure 10:
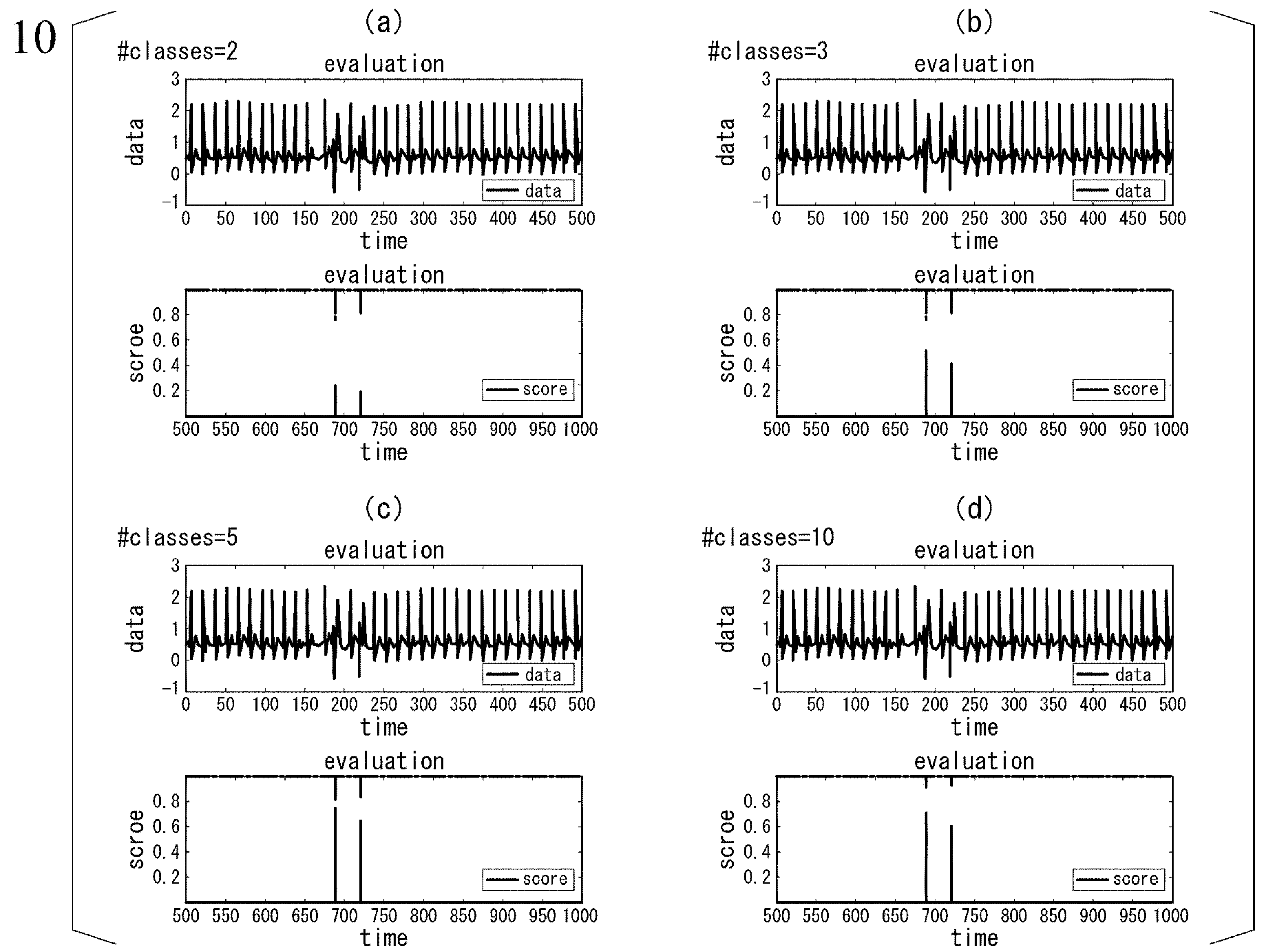
FIG. 10 is a diagram illustrating results of Example 4.

FIG. 10 is a diagram illustrating results of Example 4. In Example 4, the calculation was performed by changing the number of class labels c. In FIG. 10, the class labels c was set to 2 in (a), the class labels c was set to 3 in (b), the class labels c was set to 5 in (c), and the class labels c was set to 10 in (d).

As illustrated in FIG. 10, in Example 4, the discriminator was able to discriminate that the signal contained noise as in Example 1.

REFERENCE SIGNS LIST

1 Matched filter
10 Filter bank
20 Softmax function
30 Loss function
40 Parameter updating unit
50 Reservoir computing
51 Register
52 Multiplier
53 Adder
100, 101 Discriminator
E Element
$L_{in}$ Input layer
$L_{out}$ Output layer
R Reservoir layer
w Weight

What is claimed is:

1. A discriminator apparatus comprising:
a filter bank being configured as a digital filter and including a plurality of nonlinear matched filters each having a response characteristic to a signal with a specific waveform and each transforming a time-series input signal into a plurality of features in accordance with the response characteristic, the filter bank including:
a plurality of elements to which the input signal is input,
a plurality of registers connecting an n-th (where n is a natural number) element to an n+1-th element and inputting a signal from the n-th element to the n+1-th element with a delay,
a plurality of multipliers multiplying each of output signals output from the plurality of elements by a weight, and
an adder adding results multiplied by the plurality of multipliers, wherein
the plurality of features are received from the adder and transformed into a probability distribution by a softmax function;
a cross-entropy loss is obtained between the probability distribution and class labels; and
a parameter of each of the plurality of nonlinear matched filters is adjusted based on the cross-entropy loss by an extended Kalman filter, the extended Kalman filter computing a Jacobian of an output layer including the softmax function by partially differentiating the softmax function, determining a Kalman gain, and sequentially updating the parameter according to w k+1=w_k+K_k·e_k, where K_k is the Kalman gain and e_k is the cross-entropy loss.

2. The discriminator apparatus according to claim 1,
wherein the filter bank is reservoir computing that has a reservoir for nonlinear transform of a signal and an output layer applying weights to signals transformed by the reservoir and outputting a signal, and
wherein the parameter is the weights of the output layer.

3. The discriminator apparatus according to claim 2, wherein a parameter of the reservoir is set by pre-training based on a mutual information amount.

* * * * *